United States Patent
Miller et al.

(10) Patent No.: US 10,392,228 B2
(45) Date of Patent: Aug. 27, 2019

(54) BUTTON HOOK PAD HANGER

(71) Applicant: Harry Miller Company, Inc., Boston, MA (US)

(72) Inventors: Harry Miller, Boston, MA (US); Michael Frisch, Braintree, MA (US)

(73) Assignee: HARRY MILLER CO., LLC, Boston, MA (US)

( * ) Notice: Subject to any disclaimer, the term of this patent is extended or adjusted under 35 U.S.C. 154(b) by 123 days.

(21) Appl. No.: 15/671,075

(22) Filed: Aug. 7, 2017

(65) Prior Publication Data

US 2017/0355566 A1   Dec. 14, 2017

Related U.S. Application Data

(60) Continuation-in-part of application No. 15/358,108, filed on Nov. 21, 2016, now abandoned, and a continuation-in-part of application No. 14/964,447, filed on Dec. 9, 2015, now Pat. No. 9,758,350, which is a division of application No. 13/801,642, filed on Mar. 13, 2013, now abandoned, which is a continuation-in-part of application No. 13/790,959, filed on Mar. 8, 2013, now Pat. No. 9,499,930.

(51) Int. Cl.
*B66B 11/02*     (2006.01)
*F16M 13/02*    (2006.01)
*A47H 1/18*     (2006.01)
*A47H 23/02*    (2006.01)

(52) U.S. Cl.
CPC ............ *B66B 11/0246* (2013.01); *A47H 1/18* (2013.01); *B66B 11/0226* (2013.01); *B66B 11/0253* (2013.01); *F16M 13/02* (2013.01); *A47H 2023/025* (2013.01); *Y10T 24/51* (2015.01); *Y10T 29/49629* (2015.01); *Y10T 156/1056* (2015.01); *Y10T 428/192* (2015.01)

(58) Field of Classification Search
CPC ..................................................... E04B 1/2403
USPC ........................................................... 428/58
See application file for complete search history.

(56) References Cited

U.S. PATENT DOCUMENTS 2,840,155 A    6/1958   Stern
3,115,804 A   12/1963   Johnson
3,702,087 A   11/1972   Schmitt
(Continued)

OTHER PUBLICATIONS

Search Report Under Section 17; dated Aug. 11, 2018; 1 page.
(Continued)

*Primary Examiner* — Brent T O'Hern
(74) *Attorney, Agent, or Firm* — Lowe Graham Jones PLLC

(57) ABSTRACT

Embodiments are directed to protecting an elevator. A plurality of knobs may be provided, each respective knob comprising a respective base having a vertical portion, a horizontal portion, a suspension portion, and a face that are coupled to each other. Each knob may also comprise a respective stem coupled to the face of the respective base. The knobs may be hung from an upper edge of a wall panel or suspended ceiling grid in an elevator. A cover may be provided, the cover having a plurality of openings in the cover disposed along the upper edge of the cover. The cover may be hung from the knobs with each knob having the distal end portion of the respective stem extending through a respective one of the openings in the cover.

10 Claims, 10 Drawing Sheets

(56) References Cited

U.S. PATENT DOCUMENTS

| | | |
|---|---|---|
| 3,894,754 A | 7/1975 | Staats |
| 4,033,243 A | 7/1977 | Kirrish et al. |
| 4,045,076 A | 8/1977 | Day, Sr. et al. |
| 4,089,129 A | 5/1978 | Patterson, Jr. |
| 4,266,677 A | 5/1981 | Dewsnap |
| 4,324,074 A | 4/1982 | South et al. |
| 4,459,521 A | 7/1984 | Barge |
| 4,490,083 A | 12/1984 | Bebish |
| 4,611,779 A | 9/1986 | Leonard, Jr. |
| 4,646,997 A | 3/1987 | Fadley |
| 4,708,222 A | 11/1987 | Bills et al. |
| 4,728,238 A | 3/1988 | Chisholm et al. |
| 4,924,973 A | 5/1990 | Miller |
| 4,983,047 A | 1/1991 | Netto |
| 5,143,500 A | 9/1992 | Schuring et al. |
| 5,255,885 A | 10/1993 | Iversen |
| 5,620,159 A | 4/1997 | Tack |
| 5,660,402 A | 8/1997 | Jones et al. |
| 5,738,159 A | 4/1998 | O'Brien |
| 5,816,557 A | 10/1998 | Tepper |
| 6,223,914 B1 | 5/2001 | Snell |
| 6,446,932 B1 | 9/2002 | Butterfield et al. |
| 6,471,169 B1 | 10/2002 | Maloney |
| 6,641,105 B1 | 11/2003 | Hamerski |
| 7,021,001 B1 | 4/2006 | Schooler |
| 7,040,582 B2 | 5/2006 | Rosler |
| 7,086,635 B1 | 8/2006 | Drapeau |
| 7,563,063 B1 | 7/2009 | Madej |
| 8,136,209 B1 | 3/2012 | Willison |
| 8,286,310 B1 | 10/2012 | Negron |
| 8,468,767 B1 | 6/2013 | McBride |
| 8,608,239 B1 | 12/2013 | Lawson et al. |
| 9,234,979 B2 | 1/2016 | Bolbocianu et al. |
| 2002/0153463 A1 | 10/2002 | Muller et al. |
| 2003/0011229 A1 | 1/2003 | Bell |
| 2006/0006823 A1 | 1/2006 | Ferretti |
| 2006/0038100 A1 | 2/2006 | Grieszmer et al. |
| 2007/0243784 A1* | 10/2007 | Shearrow .............. A47G 9/0284 442/320 |
| 2010/0050787 A1 | 3/2010 | Abert et al. |
| 2011/0271571 A1 | 11/2011 | Lennard |
| 2012/0085759 A1 | 4/2012 | Sabounjian |
| 2013/0270409 A1 | 10/2013 | Osorio |
| 2014/0138508 A1 | 5/2014 | Margulis et al. |
| 2014/0255639 A1 | 9/2014 | Miller et al. |
| 2014/0263887 A1 | 9/2014 | Frisch |

OTHER PUBLICATIONS

Soft grip Adhesive Hook, Retrieved Dec. 2012, from http://www.organizedobie.com/products/3121/Soft-Grip-Adhesive-Hook.
Command Timeless Brushed Nickel Finish Medium Hook, Retrieved Dec. 2012, from http://www.command.com/wps/portal/3M/en_US/NACommand/Command/Products/Catalog/~/Command-Timeless-Brushed-Nickel-Finish-Medium-Hook?N=5925317&rt=rud>.

* cited by examiner

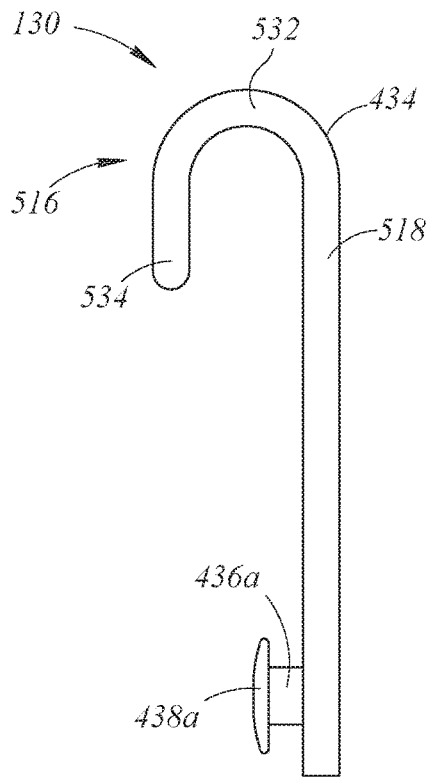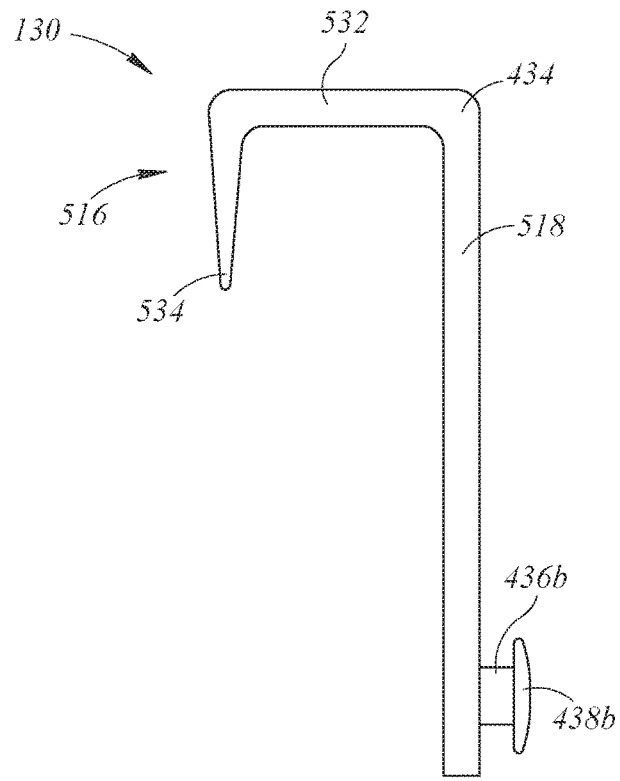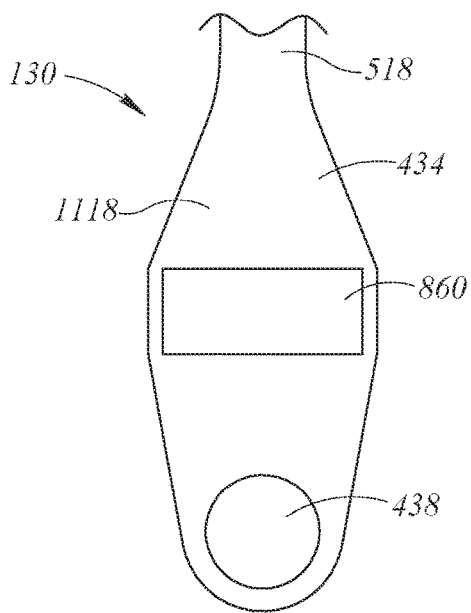
FIG. 9
FIG. 10
FIG. 11

BUTTON HOOK PAD HANGER

PRIORITY CLAIM

This patent application is a Continuation-in-Part of U.S. patent application Ser. No. 15/358,108, entitled ELEVATOR COVER ASSEMBLY, filed on Nov. 21, 2016, which is a Continuation-in-Part of U.S. patent application Ser. No. 13/790,959 (now U.S. Pat. No. 9,499,930), entitled ELEVATOR COVER ASSEMBLY, filed on Mar. 8, 2013, each of which is herein incorporated in entirety by reference. This application is also a Continuation-in-Part of U.S. patent application Ser. No. 14/964,447 (now U.S. Pat. No. 9,758,350), entitled ELEVATOR PAD HANGING APPARATUS AND METHOD, filed on Dec. 9, 2015, which is a Divisional of U.S. patent application Ser. No. 13/801,642, entitled ELEVATOR PAD HANGING APPARATUS AND METHOD, filed Mar. 13, 2013, each of which is herein incorporated in entirety by reference.

TECHNICAL FIELD

The invention relates generally to hangers for cover assemblies to protect a surface and, more particularly, yet not exclusively, to hangers in elevators for cover assemblies to protect interior walls of the elevators.

BACKGROUND

Elevator pads are commonly used in elevators to protect the interior surfaces from scratching or other damage. The elevator pads can be attached to the interior walls of the elevator when a large or potentially damaging cargo is to be carried by the elevator, such as when a tenant in an apartment building moves in or out. Conventionally, these elevator pads are clipped to the walls of the elevator or otherwise attached by a metal hanger or by another type of hardware. The pads may include holes in the pad itself, with the holes being arranged at certain intervals along a top edge of the pad to attach to a peg or post in the elevator.

This arrangement has significant disadvantages. For example, the spacing of the holes may not match the spacing of the pegs in a given elevator installation. Making additional holes or other modifications to a pad can be a costly process and may compromise the strength of the pad. Making adjustments to the pegs in the elevator can be even more costly and difficult. Thus, it is with regard to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein:

FIG. 9 shows a side view of an example implementation of the knob of FIG. 5B;

FIG. 10 illustrates a side view of another example implementation of the knob of FIG. 5B; and FIG. 11 shows a front view of an example implementation of the knob of FIG. 5B.

DETAILED DESCRIPTION OF THE VARIOUS EMBODIMENTS

Figure 1:
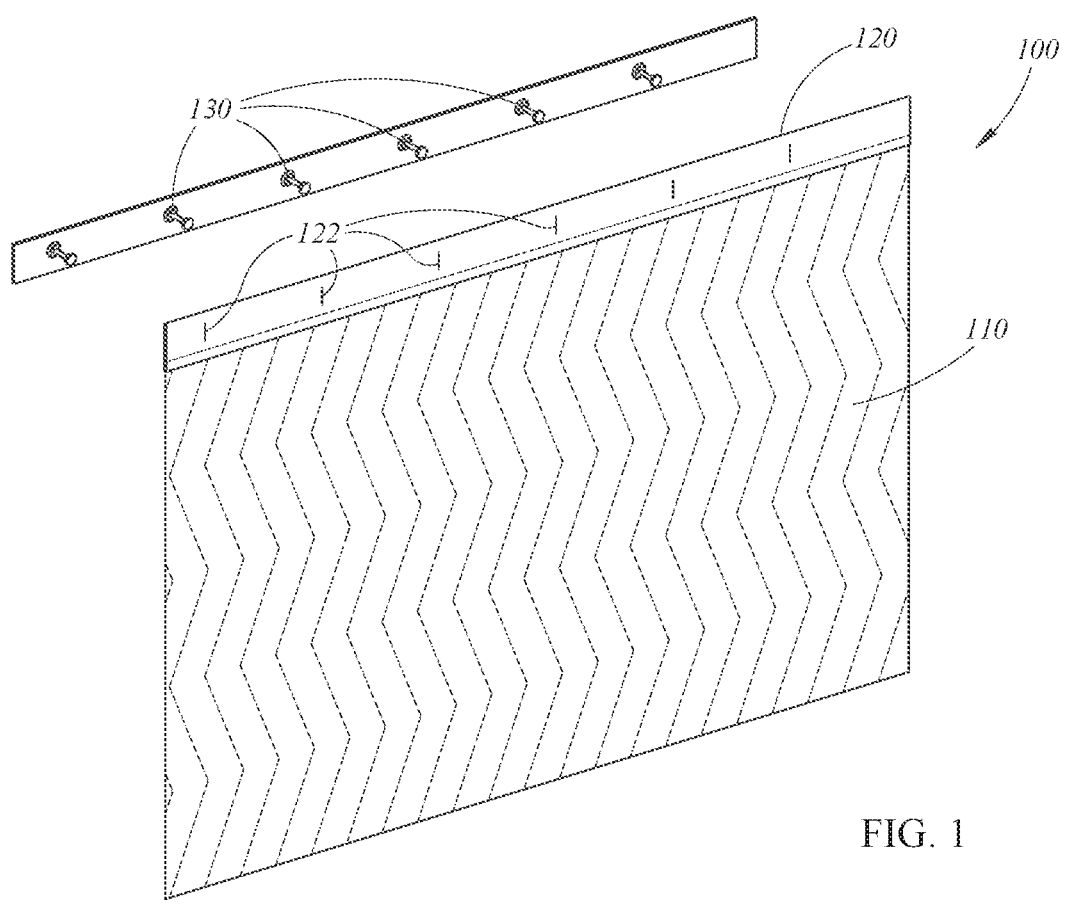
FIG. 1 illustrates a schematic isometric depiction of an example elevator cover assembly having a cover, a trim, and knobs.

FIG. 1 illustrates a schematic isometric depiction of an elevator cover assembly 100 having a cover 110 and a trim 120. The cover 110 is a sheet of material with sufficient resiliency and padding to protect a surface, such as an interior surface of an elevator. The embodiments of the invention disclosed herein may be specifically tailored to protect interior elevator walls. The cover 110 may include flexible fabric with padding sewn into the interior. The cover 110 can include rigid panels joined together with flexible fabric sections. The cover 110 is generally flexible enough to fit through the elevator door. The trim 120 is a strip of material positioned at an edge of the cover 110. The trim 120 may be attached to the cover 110 by stitching or other suitable attachment means. The trim 120 has a plurality of openings 122 formed in the trim 120. In some embodiments, the trim 120 is made of a flexible material, such as a woven synthetic material like nylon, that is attached to the edge of the cover 110 with a portion of the trim 120 extending beyond the edge of the cover 110.

The trim 120 may be formed as a separate piece from the cover 110 and may be later attached to the cover 110. The trim 120 can be made in large quantities separate from the cover and can be cut to any length to fit any size of cover. The openings 122 can easily be formed in the trim 120 before the trim 120 is attached to the cover 110. In some embodiments, the openings 122 are slits formed by passing a heated blade through the trim 120 at desired intervals. The heated blade may also melt-fuse the cut synthetic material ends to bond them together such that they are unlikely to fray or tear. The openings 122 can also be holes, key-hole openings (for example, combination slit and hole), crescent shape openings, or the like. In other embodiments, the trim 120 can be initially formed to include the openings, such as by including a lower scalloped or jagged edge that will engage a knob to keep the cover in place.

The apparatus and methods of production of the present invention may provide economic benefits compared to conventional methods, such as cutting and sewing buttonholes in the cover itself. In some embodiments, the trim 120 can be passed under a wheel having appropriately shaped blades at desired intervals such that the openings 122 are formed by simply moving a trim web under the blade wheel. As mentioned above, the blades can be heated to fuse the edges of the openings in the synthetic material that forms the trim to prevent fraying or tearing. In other embodiments, the openings 122 can be formed using a radio frequency weld, which may also be very cost-effective compared to conventional techniques.

The flexible nature of the trim 120 may allow the trim 120 to be deformed to spread the openings 122 to insert a knob 130 into the slits. The spacing of the openings 122 may correspond to the spacing of the knobs 130 for hanging. For example, the knobs 130 can be positioned in the interior of an elevator near the top of the elevator walls. In some embodiments, the trim material is chosen such that it can withstand openings 122 separated by very short intervals, such as approximately one inch between openings 122. Likely, this spacing is more frequent than the knobs 130 will be, but the high frequency may make the assembly able to fit a variety of knob configurations.

In some embodiments, the trim 120 is oriented generally horizontally and is positioned at a top of the cover 110. In other embodiments, the trim 120 can be positioned vertically along a side edge of the cover 110. The cover assembly 100 can have multiple trims 120 along multiple edges of the cover 110. For example, the cover 110 can have a trim 120 at the right and left-hand side of the cover 110 to engage with knobs 130 aligned vertically at a deployment site, or the cover 110 can have a trim 120 at all four edges of the cover 110. In still further embodiments, the trim 120 is positioned at an interior position on the cover 110 to provide still further engagement points.

The number, spacing, and layout of the knobs 130 can vary as needed. For example, for embodiments in which the cover assembly 100 is to be used with very heavy-duty equipment, where the cover 110 itself is relatively heavy, the trim 120 and corresponding knobs 130 can be more numerous and placed closer together. In other circumstances in which the cover 110 is relatively light, the openings 122 and corresponding knobs 130 can be spaced further apart. The size of the individual openings 122 can also vary according to expected load. Another variable that may influence the size of the openings 122 is the aesthetic placement of the knobs 130 in the elevator or other location. For example, the openings 122 and knobs 130 may be aligned linearly at approximately the same level such that the load of the cover 100 when resting on the knobs 130 is distributed evenly on the openings 122. The openings 122 and knobs 130, however, may not always be aligned in a linear array, perhaps for functional or aesthetic reasons. The pattern of the openings 122 can match the pattern of the knobs 130. With enough openings 122 in the trim 120, the alignment to various knobs 130 that may not have the exact spacing of the openings 122 can still be accommodated.

Figure 2:
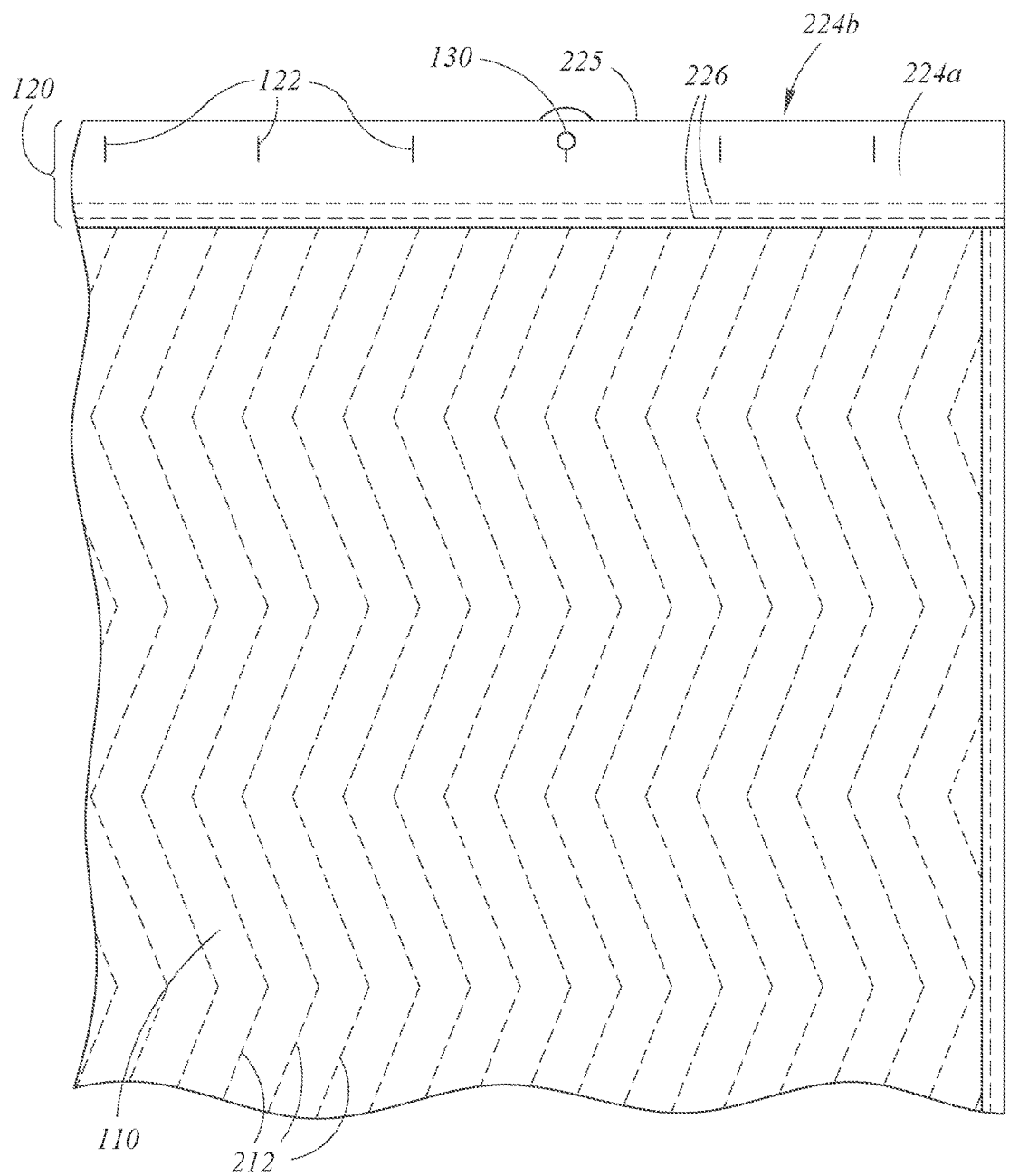
FIG. 2 shows a front view of the cover and trim of FIG. 1 with one of the knobs of FIG. 1.

FIG. 2 shows a front view of the cover 110 and the trim 120 with a single knob 130 coupled to the trim 120. As shown in FIG. 2, the cover 110 has a herringbone stitching pattern 212 that may improve padding capabilities. The trim 120 may be a separate piece of material from the cover 110 that is then stitched to the cover 110 with two linear stitches 226. The trim 120 has a first side 224a, an upper edge 225 of the trim 120, and a second side 224b (on reverse side of trim 120; not visible in FIG. 2) opposite the first side 224a. The trim 120 includes multiple openings 122 spaced throughout the trim 120. The openings 122 can be made using a heated blade that melts the edges of the openings 122 to prevent fraying. In other examples, the openings 122 can be cut or otherwise formed in the trim 120 and then heated later to seal the edges against fraying. When the trim 120 is a separate piece of material, the trim 120 can be made of a different material than the cover 110, which may not withstand so many openings 122 at such small intervals without expensive reinforcement and or expensive cuts to make the openings 122. A conventional elevator pad is designed to withstand impacts but not necessarily to support its own weight when perforated by several slits at small intervals. This drawback may be avoided by the assembly 100.

A knob 130 is shown protruding through one of the openings 122. The trim 120 may have more openings 122 than the expected number of knobs 130 to provide compatibility with a number of different knob layouts. The material of the trim 120 and the cover 110 can be such that having extra openings 122 does not substantially weaken the cover assembly 100 and may reduce the cost of manufacture by obviating the need to match certain opening configurations with various knob configurations. A building proprietor or service contractor, therefore, need not know the exact layout of the knobs in the elevator and potentially select a cover that does not fit the knobs. The high number and small interval of the openings 122 provides a one-size-fits-all approach that may reduce costs of manufacture and ownership.

Figure 3:
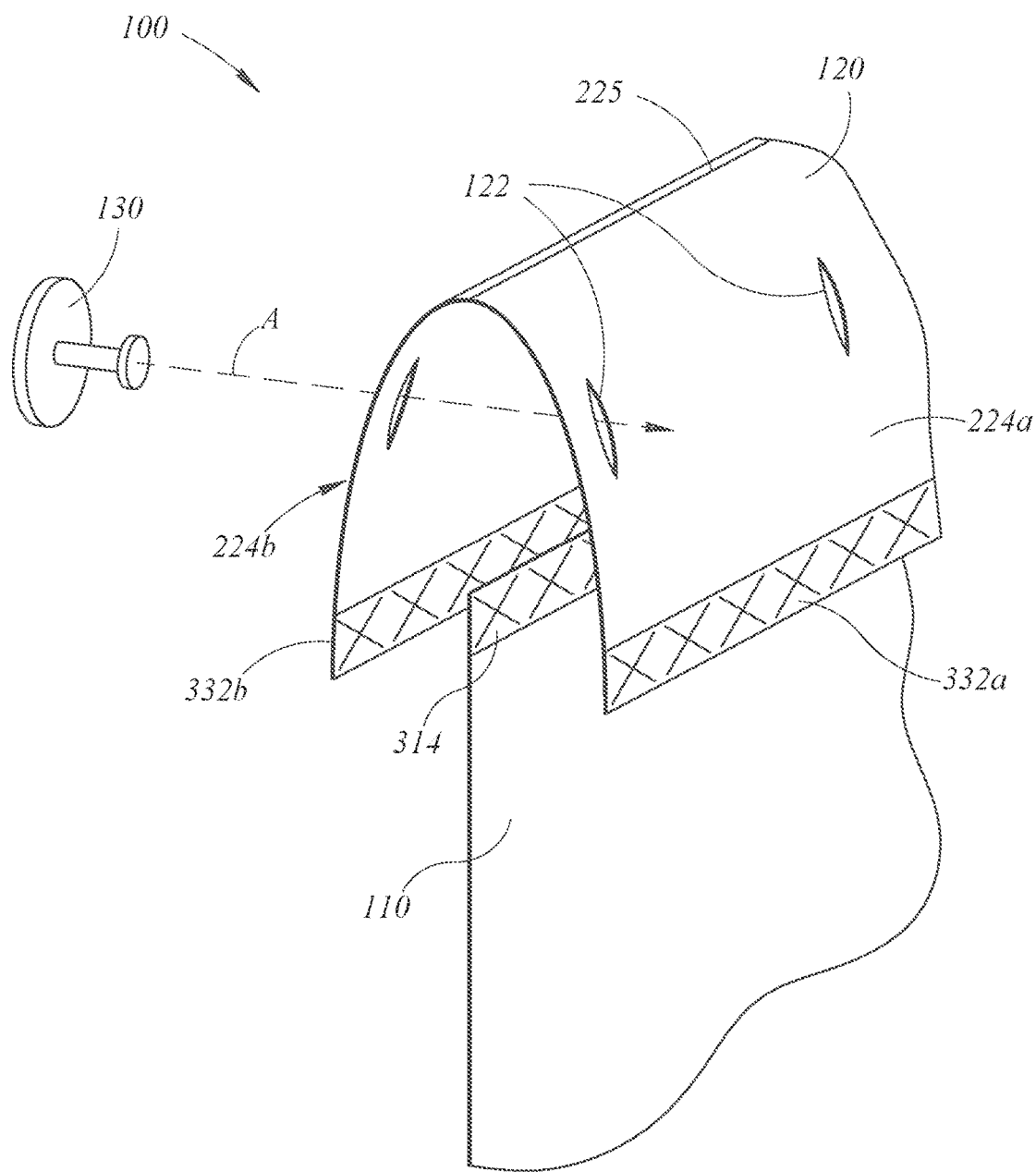
FIG. 3 illustrates a schematic, isometric, exploded view of the cover, trim, and knob of FIG. 2.

FIG. 3 illustrates a schematic, isometric, exploded view of the cover 110, trim, 120 and knob 130 of FIG. 2. An edge 314 of the cover 110 can be the top, bottom, or side edge 314 of the cover 110. The edge 225 of the trim 120 can be formed by a fold between the first side 224a and the second side 224b of the trim 120. As illustrated in FIG. 3, the first side 224a has a first trim edge 332a, and the second side 224b has a second trim edge 332b. The first trim edge 232a, cover edge 114, and second trim edge 332b are stitched together to join the trim 120 to the cover 110. The trim 120, therefore, extends beyond the cover edge 314 by a certain distance. The assembly also includes openings 122 formed in this portion of the trim 120 for coupling with the knob 130 via the openings 122 as shown by arrow A. The openings 122 can pass through one side of the folded trim 120 or through both sides of the folded trim 120. In some embodiments, the openings 122 do not pass through the cover 110. The amount of trim 120 protruding beyond the cover edge 314 depends on the size and layout of the openings 122. In other embodiments, the cover edge 314 can extend all the way to the fold 225, and the openings 122 can be formed in the trim 120 as well as through the cover 110. In still further embodiments, the trim 120 can be a single sheet of material stitched to the cover 110 on one side, having no fold 225, and having openings 122 that engage the knobs 130. The trim 120 can be a long, continuous strip of material as shown in FIGS. 1-3, or it can be smaller, discrete fabric sections having openings 122 configured to engage knobs 130 to hold the cover assembly 100 in place. In still further embodiments, the openings 122 can be formed directly into the cover 110 and the trim 120 can be omitted partially or entirely.

In one example, the first and second trim edges 332a and 332b are attached to an upper portion or area of the cover 110 such that the upper edge 314 extends upwardly toward the fold 225 and beyond the trim edges. Thus, the upper edge 314 does not necessary need to be attached to the trim edges 232a and 232b. Rather, the upper edge 314 could extend up to the fold 225, whether inside or outside of the enclosure formed by trim 120. In other examples, the openings 122 can be formed through the upper portion or area of the cover 110.

Figure 4:
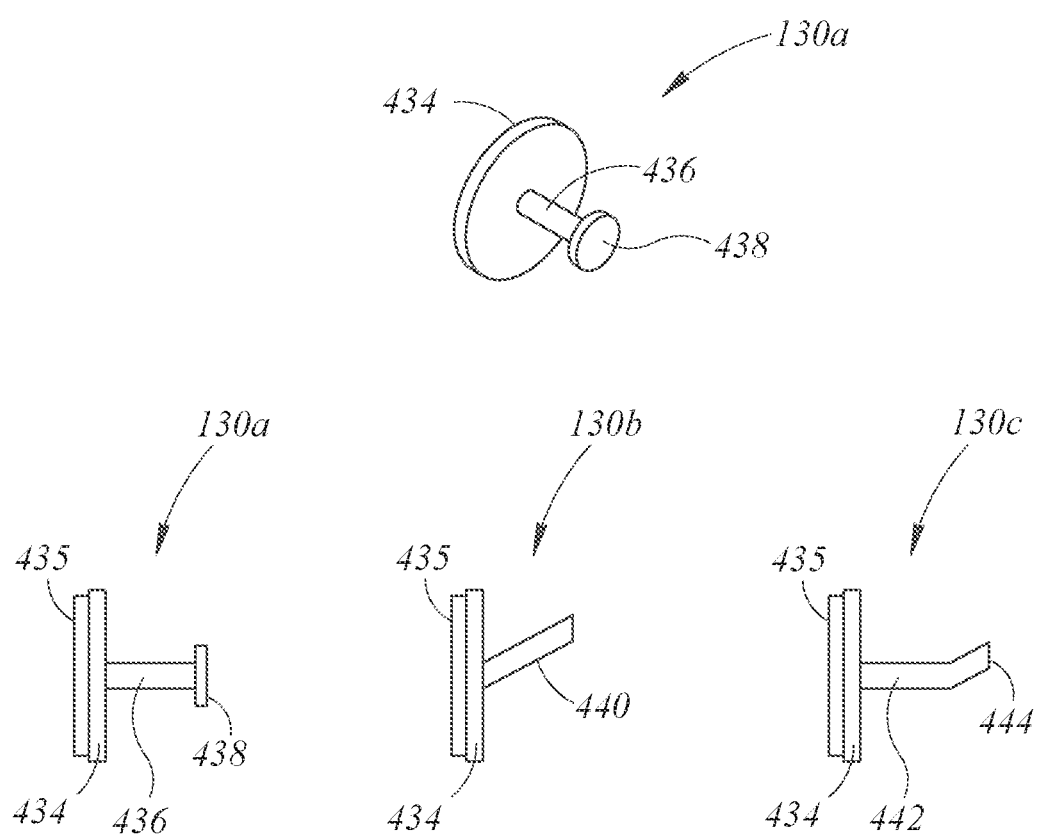
FIG. 4 shows various example implementations of the knobs of FIG. 1.

FIG. 4 shows several knob configurations for use with the elevator cover assembly 100. The knob 130a has a base 434, a stem 436, and a head 438 at an end of the stem 436. As shown in FIG. 4, the head 438 is integral to the stem 436, and the stem 436 is integral to the base 434. The head 438 can be slightly larger than the stem 436 to prevent the cover assembly 100 from falling off the knob 130. Base 434 may include a quick-cure adhesive 435 on the backside thereof for easy application to a wall, including glass. The adhesive 435 can be a high-strength adhesive such as a 3M's VHB 4941 acrylic adhesive tape that provides excellent adhesion to a broad range of high and medium surface energy substrates including metals, glass, and a wide variety of plastics and plasticized vinyl, even with mismatched substrates. Suitable adhesive tapes may have very high tensile strength having a normal tensile strength of between 480-620 kPa, a 90° peel adhesion strength of between 245-385 N/100 mm, and a dynamic overlap sheer strength of between 450-620 kPa. Use of an adhesive 435 allows the knob 130a to be attached to the wall without intrusive and expensive penetration of the wall such as by drilling or puncturing. In other embodiments, the base 434 includes another attachment mechanism, such as a threaded fastener or the like. Other than the adhesive layer 435, the knob 130a can be a unitary piece of material or can be a base 434 welded to a stem 436 and a head 438 welded to the stem 436. It may be formed by machining or otherwise forming from a single piece of material, preferably metal.

Another embodiment is knob 130b, which has a base 434 and an upwardly angled stem 440. The upward slope keeps the cover assembly 100 from slipping off the knob 130b and therefore may obviate the desire for a head 440. The slope and length of the knob 130b can vary as needed for a particular installation. Another embodiment is knob 130c, which includes a base 434, a horizontally extending stem portion 442, and an upwardly extending portion 444 that functions similarly to the head 438 to prevent the cover assembly 100 from slipping off the knob 130c. In any of these embodiments, the base 434 can be omitted in favor of a simple stem 436, 440, 442 (optionally in combination with a head 438) extending from the wall of the elevator. In some embodiments, the knob 130 can include a base 434 having multiple projections extending therefrom. Any suitable configuration of the knob 136 can be used with the elevator cover assembly 100. As such, the knob 130 is configured to receive an opening 122 of a wall cover 110.

The head 438 is configured (for example, sized and shaped) to receive an opening 122 of a wall cover 110 to hang the wall cover 100 to protect a wall. In one example, the head 438 has a cross-sectional area having a shape being one of a square, a rectangle, an oval, a circle, and a polygon. In one example, a perimeter edge (e.g., an entire perimeter) of the head 438 is formed at an angle relative to a central axis of the stem 436 (for example, an "angle" between 20 and 70 degrees). Similarly, a perimeter edge of the base 434 can be formed at a similar angle relative to the central axis of the stem 436 as that of the angled edges of the head 438. Edge portions adjacent the perimeter edges can also be chamfered (for example, rounded, smoothed, angled, or the like) to minimize damage to objects impacting the knob 130.

In some examples, the knob 130 has a conically shaped body extending outwardly from the base 434 and the wall. Such a conically shaped body may allow a wall cover 100 to smoothly slide along the upper portion of the conical body when an individual disposes an opening 122 of the cover 110 over the knob 130. And, the outward conical body further vertically supports a wall cover 110 at the upper portion of the knob 130. In one aspect, the knob 130 includes a solid conically shaped body that terminates at a planar surface that is parallel to the wall when installed.

Figures 5A, 5B:
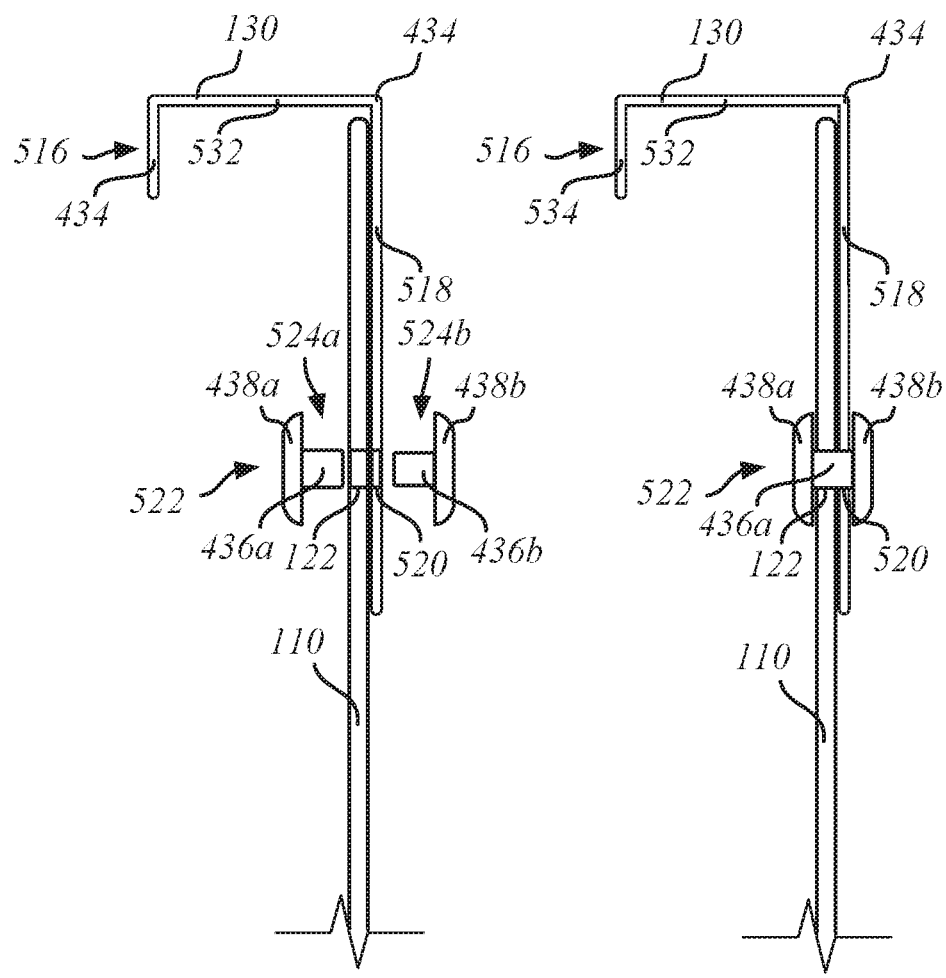
FIG. 5A illustrates a side, exploded view of another example implementation of a cover and one of the knobs of FIG. 1.
FIG. 5B shows a side, non-exploded view of the cover and knob of FIG. 5A.

FIG. 5A illustrates a side, exploded view of another example implementation of a cover 110 and one of the knobs 130 of FIG. 1. As shown in FIG. 5A, the base 434 of knob 130 forms a hook. For example, the base 434 may include a hanging portion 516 that engages a wall or panel of an elevator and a suspension portion 518 that engages an upper edge portion of the protective cover 110. As is apparent in FIG. 5B, the hanging portion 516 include a horizontal portion 532 that is oriented perpendicular to the suspension portion 518 at a first edge of the horizontal portion 532 and that secures or mechanically couples a vertical portion 534 at an opposing edge of the horizontal portion 532, such that both the suspension portion 518 and vertical portion 534 extend in the same direction and are suitable for capturing a portion of a wall or wall panel of an elevator therebetween. Accordingly, a separation distance between the vertical portion 534 and the suspension portion 518 may be slightly larger than, for example, of a width of the panel with which the knob 130 is used (for example, within five or ten percent). Other forms and shapes of hooks may also be used.

The suspension portion 518, horizontal portion 532, and vertical portion 534 may be formed of a monolithic piece of material or secured to one another by means of welds, bolts, or any other fastening means. Some or all of the suspension portion 518, horizontal portion 532, and vertical portion 534 may be covered with a compliant or cushioning material or coating in order to prevent damage to an elevator wall or wall panel. In some embodiments, the inner surfaces of the suspension portion 518 and vertical portion 534 (those surfaces of the suspension portion 518 and vertical portion 534 facing one another) and a lower surface of the horizontal portion 532 may be coated with a compliant or cushioning material or have a pad or cushion secured thereto.

With the protective cover 110 facing, engaging, or otherwise adjacent, the suspension portion 518, the protective cover 110 may be fastened to the suspension portion 518. For example, the suspension portion 518 may include an aperture 520. A fastener 522 of the knob 130 is passed through the aperture 520 and the opening 122 in the cover 110 and captures the suspension portion 518 and protective pad 510 therebetween. In one embodiment, the fastener 522 is a snap rivet that includes a first portion 524a and a second portion 524b that engage one another in a removable or non-removable fashion. For example, the first and second portions 524a, 524b may include heads 438a, 438b that are sufficiently wide to capture a significant portion of the protective cover 110 and suspension portion 518 therebetween, as shown in FIG. 5B.

The manner in which the heads 436a, 536b secure to one another through the aperture 520 and opening 122 may include any manner known in the art of plastic rivets. For example, one of the heads 536a may have a receiving stem 436a secured thereto, the receiving stem 436a having a smaller diameter than the head 536a and defining an aperture. The other head 536ab may have an insertable stem 436b secured thereto. The insertable stem 436b may be insertable into the receiving stem 436a and may be retained in the receiving stem 436a by some means. For example, the insertable stem 436b may have a barb or lip that engages a groove, tab, shoulder, or other structure within the receiving stem 436a to hinder removal. In a like manner, the receiving stem 436a may have a barb or lip within a central aperture thereof that engages a groove, lip, or tab, encircling the insertable stem 436b. Any other means of securing the insertable stem 436b and receiving stem 436a together that may be suitable for plastic rivets may be used, including threaded engagement or friction fit. As another example, one or more of the stem 436b or the stem 436a may be integral to the base 434 (for example, one or more of the stem 436b or the stem 436a may be formed of a monolithic piece of material with regard to the base 434).

Figure 6A:
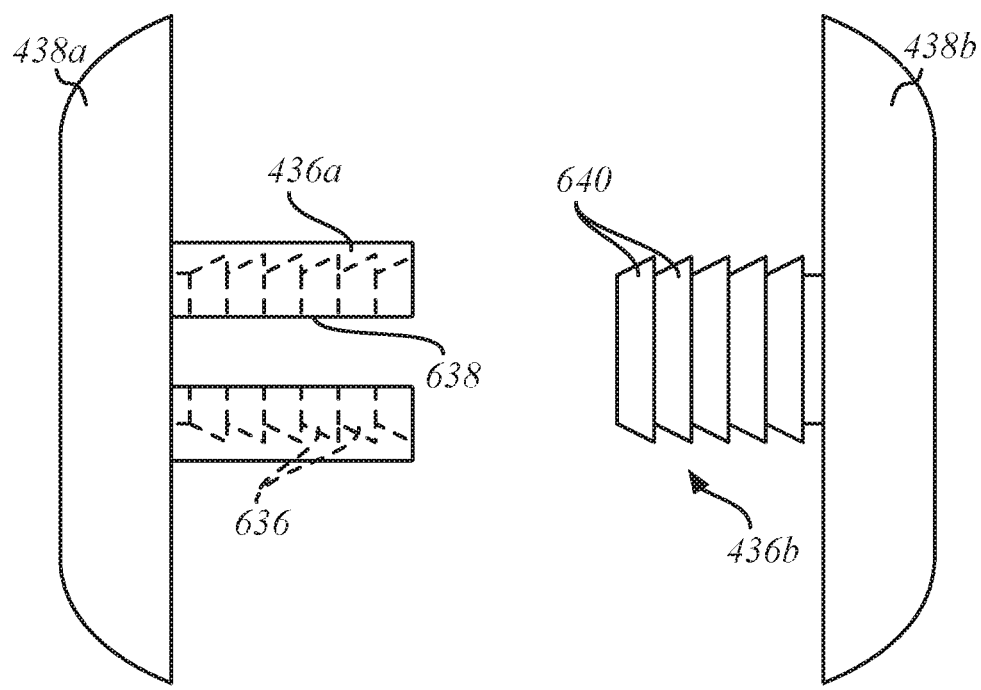
FIG. 6A illustrates a side, exploded view of a portion of the knob of FIG. 5A.
Figure 6B:
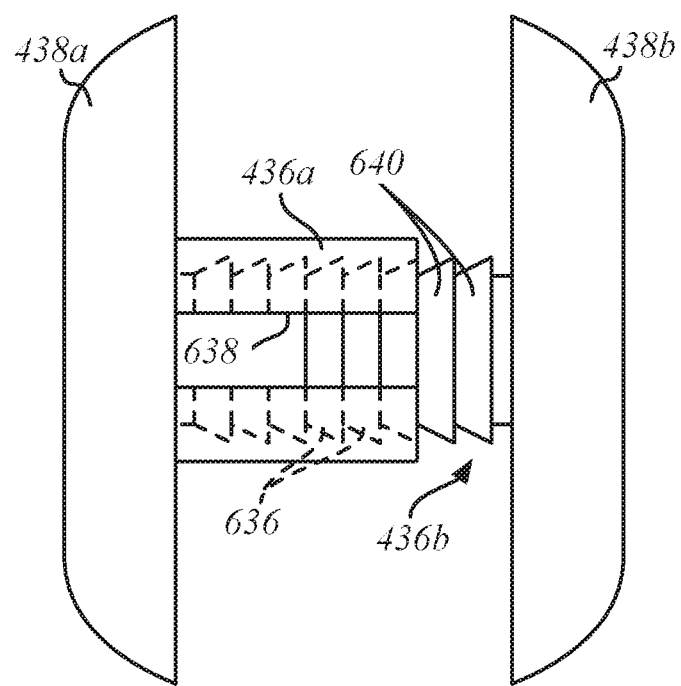
FIG. 6B shows a side, non-exploded view of the portion of the knob of FIG. 6A.

FIG. 6A illustrates a side, exploded view of an example implementation of the heads 438a, 438b and the stems 436a, 436b. FIG. 6B shows a side, non-exploded view of the heads 438a, 438b and the stems 436a, 436b. As shown, the receiving stem 436a includes a plurality of internal circumferential grooves 636. The receiving stem 436a may additionally include one or more slits 638 to facilitated compliant expansion of the receiving stem 436a. In other examples, the one or more slits 638 may instead be defined in the insertable stem 436b to facilitate compliant compression of the insertable stem 436b during insertion. In yet another example, one or both of the receiving stem 436a and the insertable stem 436b are sufficiently compliant to enable insertion without slits 638.

The insertable stem 436b may include a plurality of circumferential ridges 640 or barbs 640 that are sized to fit within the grooves 636. The pitch of the barbs 640 may be the same as the pitch of the grooves 636 such that the insertable stem 436b may be engaged at a variety of axial positions depending on a desired separation between the heads 438a, 438b. The circumferential barbs 640 may slope inward with distance toward the proximal end portion of the insertable stem 436b (the end portion of the stem 436b that is opposite from the head 438b) such that the insertable stem 436b is more readily insertable than removable. The grooves 636 may be simple cylindrical grooves or may have a taper or slope corresponding to the barbs 640.

In use, the insertable stem 436b may be urged into the receiving stem 436a. The barbs 640 may slightly deflect the walls of the receiving stem 436a, facilitated by the one or more slits 638. The barbs 640 may seat within the grooves 636, and the compliance of the receiving stem 436a may urge the grooves 636 against the barbs 640. Due to the slope and orientation of the barbs 640, removal of the insertable stem 436b may require much more force than insertion and may even be impossible without destroying the barbs 640 or walls of the receiving stem 436a. In some example implementations, the barbs 640 and grooves 636 are helical in shape (for example, the barbs 640 or grooves 636 define threads), such that disengagement of the barbs 640 and grooves 636 may be accomplished by relative rotation of the barbs 640 and grooves 636.

Figure 7:
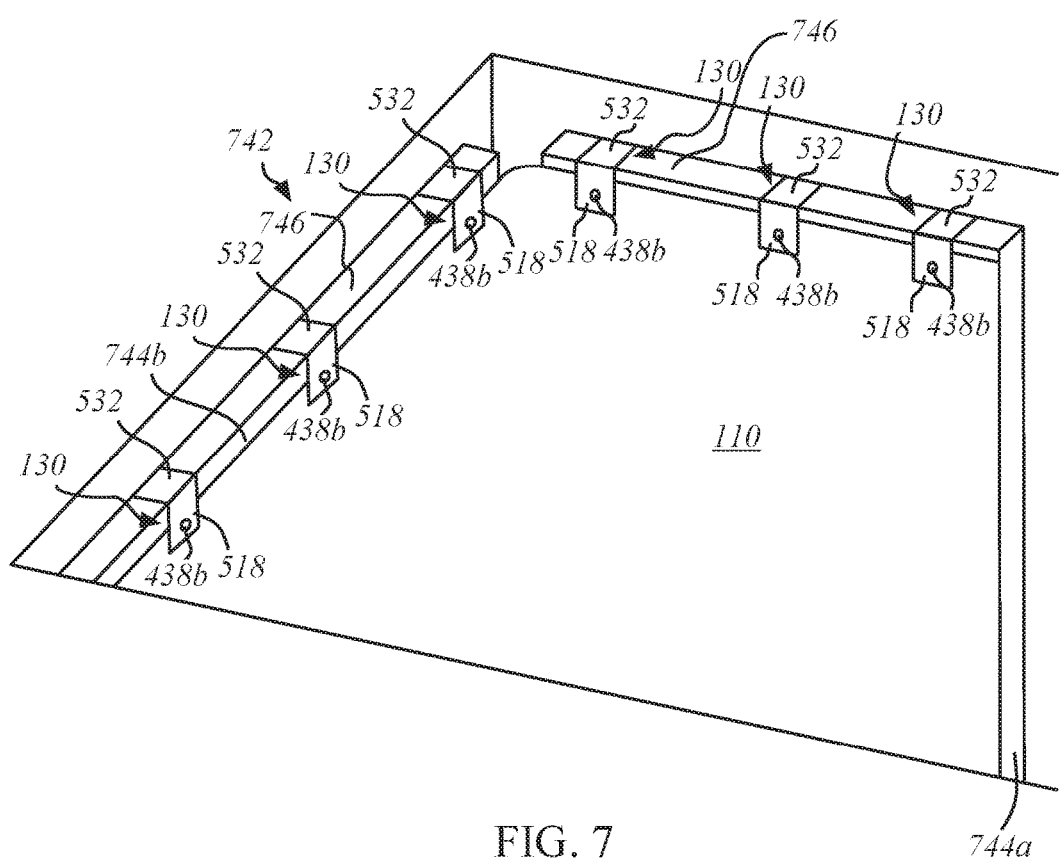
FIG. 7 illustrates an isometric view of the cover and knobs of FIG. 5B in an example elevator.

FIG. 7 illustrates an isometric view of the cover 110 and the knobs 130 in an elevator 742. The elevator 742 may be protected by engaging a number of knobs 130 with one or more wall panels 744a, 744b and hanging a protective cover 110 from the knobs 130. As illustrated, the horizontal portion 532 engages the upper edge 746 of the wall panel 744a, 744b, with the upper edge 746 of the wall panel 744a, 744b being captured between the vertical portion 534 (not shown in FIG. 7) and the suspension portion 518. The cover 110 may be oriented to cover the entirety, or substantially the entirety, of the wall panel 744a, 744b. As another example, the knobs 130 may engage a hanging ceiling grid in the elevator 742, instead of the upper edge 746 of the wall panels 744a, 744b.

Figure 8A:
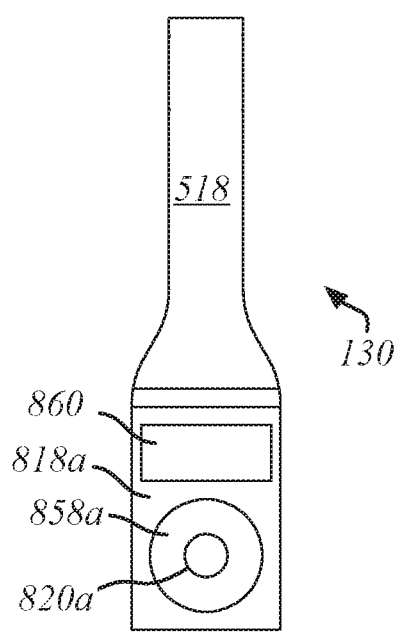
FIG. 8A shows a front view of another example implementation of one of the knobs of FIG. 1.

FIG. 8A shows a front view of another example implementation of one of the knobs 130 of FIG. 1. The suspension portion 518 may have a front portion 818a and a rear portion 818b secured thereto, such as at a lower end thereof. The front and rear portions 818a, 818b may define a gap 856 therebetween such that a protective cover 110 is insertable into the gap 856. For example, an upper end of the portions 818a, 818b may be secured to a lower end portion of the suspension portion 518 and lower ends of the portions 818a, 818b may be free to enable insertion of the protective cover 110 into the gap 856.

The front and rear portions 818a, 818b may define apertures 820a, 820b, respectively, for receiving a fastener 522. In use, the receiving stem 436a or the insertable stem 436b may pass through the aperture 820a, the opening 122 in the protective cover 110, and the aperture 820b in order to secure the cover 110 to the knob 130. In the example shown in FIGS. 8A and 8B, a front surface of the front portion 818a and a rear surface of the rear portion 818b may define countersinks 858a, 858b around the apertures 820a, 820b, respectively, to receive the heads 438a, 438b of the fastener 522. The depths of the countersinks 858a, 858b may be shaped and dimensioned to prevent the heads 438a, 438b from protruding beyond the front and rear surfaces of the portions 818a, 818b, respectively. The front portion 818a may define a recess 860 for receiving a label, such as an adhesive label, to facilitate branding or labeling of the knob 130 with other information.

Figure 8B:
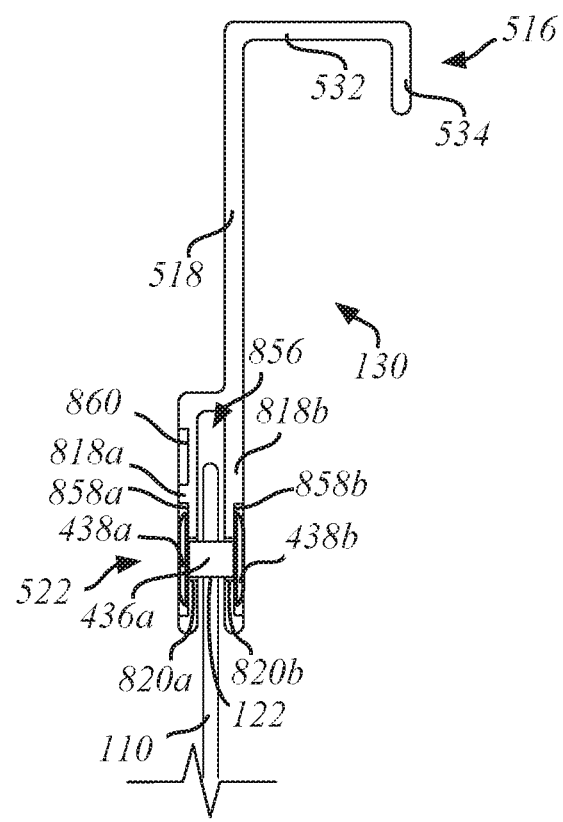
FIG. 8B illustrates a side view of an example cover and the knob of FIG. 8A.

As shown in FIG. 8A, the front and rear portions 818a, 818b may be somewhat wider than the suspension portion 518 (for example, between 50 and 120 percent wider). The increased width of the front and rear portions 818a, 818b may provide area for defining the apertures 820a, 820b and may provide sufficient material around the apertures 820a, 820b to support stresses imposed by the fastener 522 when inserted through the apertures 820a, 820b. As illustrated in FIG. 8B, the front portion 818a may protrude forwardly from the suspension portion 518, whereas the rear portion 818b may have a rear surface that is flush with the rear surface of the suspension portion 518, thus permitting the cover 110 to hang flat along a wall panel to which it is mounted.

In some example implementations, one of i) the combination of the stem 436b and the head 438b or ii) the combination of the stem 436a and the head 438a may be omitted. In some examples, employing a stem 436 and a head 438 on only a single side of the base 434 may permit placing the other side of the base 434 flush against a surface of an elevator. FIG. 9, for example, shows a side view of the knob 130 of FIG. 5B, with the knob 130 including the stem 436a and the head 438a on only the interior side of the base 434 (only a single stem 436 and a single head 438 on the same side of the suspension portion 518 as the horizontal and vertical portions 532, 534). Employing the stem 436a and the head 438a on the interior side of the base 434 may facilitate hanging a cover 110 from a suspended ceiling grid in an elevator. As also shown in FIG. 9, one or more of the horizontal portion 532 or the vertical portion 534 may be curved.

In either instance, with the stem on the interior or exterior side of the hanger, the elevator cover assembly 100 may be secured over the head 438a, 438b and onto the stem 436a, 436b by separating the openings 122 on the trim 120 and securing it over the head. The head is sized to closely accommodate an opening and provide a secure hanging securement on the stem, retained by the head.

As another example, FIG. 10 illustrates a side view of the knob 130 of FIG. 5B, with the knob 130 including the stem 436b and the head 438b on only the exterior side of the base 434 (only a single stem 436 and a single head 438 on the opposite side of the suspension portion 518 from the horizontal and vertical portions 532, 534). Employing the stem 436b and the head 438b on the exterior side of the base 434 may facilitate hanging a cover 110 from a wall panel in an elevator. As also shown in FIG. 10, one or more of the horizontal portion 532 or the vertical portion 534 may vary in thickness.

In some example implementations (for example, as shown in FIGS. 1, 3, 4, 9, and 10), the stem 436 is integral to the base 434 (for example, the face 1118 of the base 434). For example, as shown in FIGS. 1, 3, 4, 9, and 10 the stem 436 and the base 434 are formed of a monolithic piece of material. Employing an integral stem 436 may reduce the likelihood that the stem 436 unintentionally separates from the base 434 when hanging or unhanging the cover 110 on the knob 130. As another example, the proximal end portion of the stem 436 (the end portion of the stem 436 that is opposite from the head 438) may be configured (for example, sized, dimensioned, positioned, oriented, or the like) to secure the stem 436 in the aperture 520 after being pushed into the aperture 520. For example, the proximal end portion of the stem 436 may have two radially enlarged circumferential portions that are configured (for example, sized, dimensioned, and spaced apart from each other) to receive and retain the inner face of the aperture 520 therebetween.

In some example implementations, a face 1118 (for example, the front portion 818a or the rear portion 818b, as seen in FIGS. 8A and 8B) disposed at the lower end of the suspension portion 518 may have the stem 436 and the head 438 attached thereto. The face 1118 may be parallel to the suspension portion 518, which mechanically couples the face to the horizontal portion 532. In FIG. 9, for example, the stem 436a extends from the face 1118 of the base 434 in the same direction that the horizontal portion 532 of the base 434 extends from the suspension portion 518 of the base 434. In contrast, in FIG. 10, for example, the stem 436b extends from the face 1118 of the base 434 in the opposite direction from the direction in which the horizontal portion 532 of the base 434 extends from the suspension portion 518 of the base 434.

The face 1118 may have a variety of suitable shapes, such as the shape of the suspension portion 518 as shown in FIG. 7, the shape of the front portion 818a as shown in FIG. 8A, or the like. FIG. 11 shows a view of another example shape of the face 1118 of the knob 130. In this example, the width of the face 1118 varies from the top of the face 1118 to the bottom of the face 1118, increasing from the width of the suspension portion 518 at the top portion of the face 1118 to a width that slightly exceeds the width of the label recess 860 at the middle portion of the face 1118 and decreasing to a width that slightly exceeds the diameter of the head 438 at the bottom portion of the face 1118.

In some example implementations, the knob 130 is configured (for example, sized and dimensioned) to hang from an upper edge of a wall panel or suspended ceiling grid in an elevator with the vertical portion 534 of the base 130 being disposed on one side of the upper edge of the wall panel or suspended ceiling grid in the elevator and the suspension portion 518 of the base 130 being disposed on the opposite side of the upper edge of the wall panel or suspended ceiling grid in the elevator. The stem 436 of the knob 130 may be configured (for example, sized, dimensioned, positioned, oriented, or the like) to receive and suspend a portion of the cover 110 with the distal end portion of the stem 436 extending through one of the openings 122 in the cover 110. The head 438 of the knob 130 may be configured (for example, sized, dimensioned, positioned, oriented, or the like) to fit through one or more of the openings 122 in the cover 110 to removably retain the portion of the cover 110 that hangs from the knob 130 with the head 438 being disposed on the opposite side of the cover 110 from the face 1118 of the base 434.

For example, the knob 130 may have any dimensions suitable for hanging a cover 110 in an elevator. In some example implementations, the knob 130 has an overall height of at least 2, 3, 4, 4.5, 5, 5.5, or 6 inches. The head 438 disposed at the distal end portion of the stem 436 may have a diameter of at least 0.3, 0.4, 0.5, 0.6, 0.7, or 0.8 inches. The stem 436 may have a length of at least 0.05, 0.1, 0.15, 0.2, 0.25, 0.3, 0.35, 0.4, 0.45, or 0.5 inches (for example, the distance between the face 1118 and the head 438). The suspension portion 518 may have a width of at least 0.2, 0.25, 0.3, 0.35, 0.4, 0.45, or 0.5 inches. One or more portions of the base 434, such as one or more portions of the vertical portion 534, the horizontal portion 532, the suspension portion 518, or the face 1118, may have a thickness of 0.75, 0.1, 0.15, 0.2, 0.3, 0.4, or 0.5 inches.

The various embodiments have been described above with reference to the accompanying drawings, which form a part hereof, and which show, by way of illustration, specific example embodiments by which the invention may be practiced. The embodiments may, however, be embodied in many different forms and should not be construed as limited to the examples set forth herein; rather, these examples are provided so that this disclosure will be thorough and complete and will fully convey the scope of the embodiments to those skilled in the art. Among other things, the various embodiments may be methods, systems, or devices. The following detailed description is, therefore, not to be taken in a limiting sense.

Throughout the specification and claims, the following terms take the meanings explicitly associated herein, unless the context clearly dictates otherwise. The phrase "in one embodiment," "in one example," or "in one implementation" as used herein does not necessarily refer to the same embodiment, example, or implementation, though it may. Furthermore, the phrase "in another embodiment," "in another example," or "in another implementation" as used herein does not necessarily refer to a different embodiment, example, or implementation, although it may. Thus, as described throughout, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, the meaning of "a," "an," and "the" include plural references. Further, plural references should be interpreted as also disclosing singular references. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

The foregoing examples should not be construed as limiting or exhaustive, yet rather, illustrative use cases to show implementations of at least one of the various embodiments of the invention. Accordingly, many changes can be made without departing from the spirit and scope of the invention. Any feature or element described herein may be implemented additionally or alternatively to any other feature or element described herein as suitable to, for example, hang a cover 110 in an elevator. For example, any of the example implementations of the base 434 may include any of the example shapes of the vertical portion 534, horizontal portion 532, the face 1118, or the like. Thus, the scope of the invention is not limited by the disclosure of the examples. Instead, the invention should be determined entirely by reference to the claims that follow.

The invention claimed is:

1. A method for protecting an elevator, the method comprising:
   providing a plurality of knobs, each respective one of the knobs comprising:
      a respective base having a vertical portion, a horizontal portion, a suspension portion, and a face, the horizontal portion being perpendicular to the vertical portion and the suspension portion and mechanically coupling the vertical portion to the suspension portion, the suspension portion being parallel to the face and mechanically coupling the face to the horizontal portion; and
      a respective stem having a proximal end portion mechanically coupled to the face of the respective base and a distal end portion opposite the proximal end portion;
   hanging each of the knobs from an upper edge of a wall panel or suspended ceiling grid in an elevator with each respective one of the knobs having the vertical portion of the respective base being disposed on one side of the upper edge of the wall panel or suspended ceiling grid in the elevator and the suspension portion of the respective base being disposed on an opposite side of the upper edge of the wall panel or suspended ceiling grid in the elevator;
   providing a cover having an upper edge and a plurality of openings in the cover disposed along the upper edge of the cover;
   hanging the cover from the knobs with each respective one of the knobs having the distal end portion of the respective stem extending through a respective one of the openings in the cover.

2. The method of claim 1, wherein the respective stem of each respective one of the knobs is integral to the respective base.

3. The method of claim 1, wherein
   each respective one of the knobs further comprises a respective head being disposed at the distal end portion of the stem; and
   hanging the cover from the knobs comprises disposing the respective head of each respective one of the knobs opposite the cover from the face of the respective base.

4. The method of claim 1, wherein the vertical portion, horizontal portion, suspension portion, and face of the respective base of each respective one of the knobs are integral to each other and the respective stem.

5. The method of claim 1, wherein the respective stem of each respective one of the knobs extends from the face of the respective base in a same direction that the horizontal portion of the respective base extends from the suspension portion of the respective base.

6. The method of claim 1, wherein the respective stem of each respective one of the knobs extends from the face of the respective base in a direction that is opposite a direction that the horizontal portion of the respective base extends from the suspension portion.

7. The method of claim 1, wherein each respective one of the knobs lacks another stem on a side of the face of the respective base that is opposite from a side of the face of the respective base from which the respective stem extends.

8. The method of claim 1, wherein one or more of the vertical portion or the horizontal portion of the respective base of each respective one of the knobs is curved.

9. The method of claim 1, wherein the vertical portion of the respective base of each respective one of the knobs has a length and a thickness that varies along the length of the vertical portion of the respective base.

10. The method of claim 1, wherein the face of the respective base of each respective one of the knobs has a top, a bottom, a length that extends from the top of the face to the bottom of the face, and a width that varies along the length of the face.

* * * * *